Oct. 28, 1924.
R. ENGLISH
CONTAINER FOR CANDY AND THE LIKE
Filed May 19, 1921
1,513,231
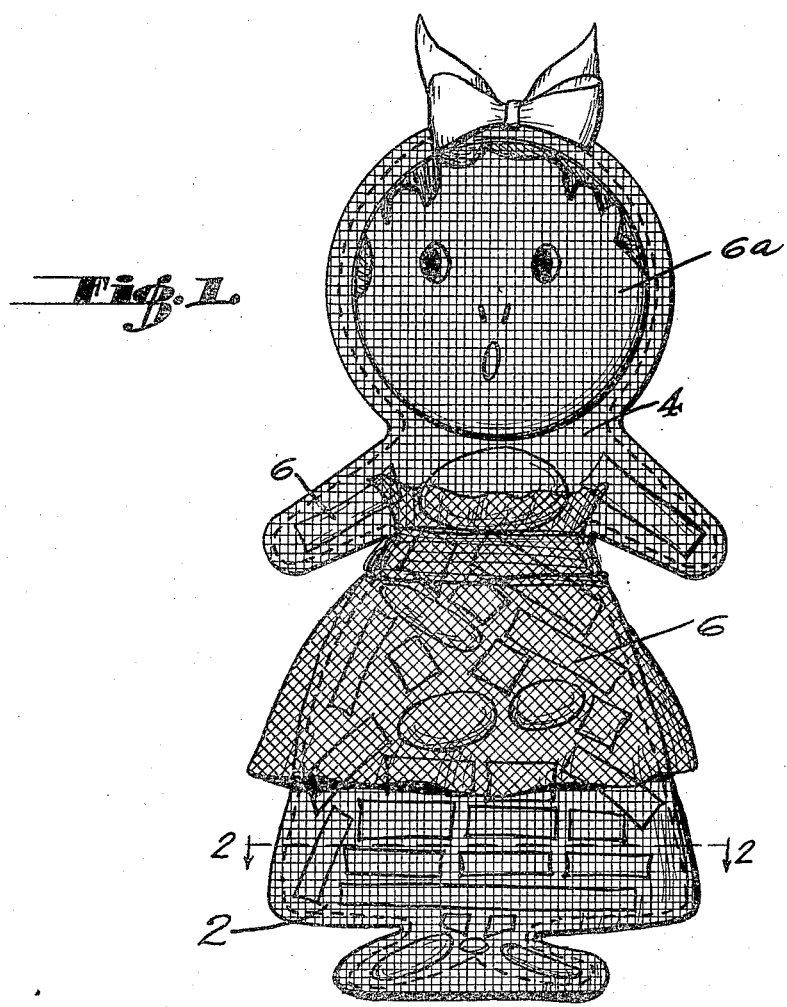
Fig. 1.
Fig. 2.
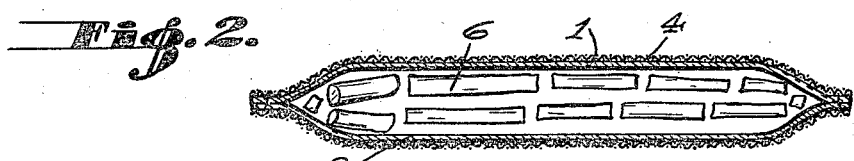
RUTH ENGLISH
INVENTOR.
BY
ATTORNEYS.

Patented Oct. 28, 1924.

1,513,231

UNITED STATES PATENT OFFICE.

RUTH ENGLISH, OF HOLLYWOOD, CALIFORNIA.

CONTAINER FOR CANDY AND THE LIKE.

Application filed May 19, 1921. Serial No. 470,760.

*To all whom it may concern:*

Be it known that I, RUTH ENGLISH, a citizen of the United States, residing at Hollywood, in the county of Los Angeles and State of California, have invented new and useful Improvements in Containers for Candy and the like, of which the following is a specification.

It is the object of this invention to provide a container for candy and the like which is so arranged as to simulate an animate figure, such as the human figure.

It is the specific object of the present invention to so arrange the container as to cause the candy or the like to be readily visible while still affording a dust-proof and sanitary container.

It is a still further object of the invention to so fill the container with pieces of candy or the like as to carry out the idea of the representation of an animate figure, and more particularly the invention contemplates the provision of designs upon the pieces of candy which are adapted to form a part of the representation of the animate figure. Thus, for example, a piece of candy may be employed for filling out the head portion of the container, and a face may be painted or otherwise suitably formed upon this piece of candy in order to give the appearance of a human figure.

The invention will be readily understood from the following description of the accompanying drawings, in which:

Figure 1 is a front elevation showing the preferred form of the invention.

Fig. 2 is a transverse section on the line 2—2 of Fig. 1.

The container is formed of sheets of material 1 and 2 which may be suitably secured together along their meeting edges as by stitching. These sheets of material are of such shape as to form a container which will preferably simulate an animate figure, such as the human figure for example.

In order that the candy, or other eatable within the container may be readily seen, while at the same time providing a sanitary construction, the sheets of material 1 and 2 are preferably formed of transparent paper, or the like. A reinforcing covering is provided over the paper container as thus constructed, said covering being shown at 4 as of a suitable fabric netting, or similar material such as is known as tarlatan. By this arrangement the container will have the necessary strength, while still making the contents thereof visible and also affording a sanitary construction.

The candy, or the like, within the container is shown at 6 and is arranged therein so as to fill out the various portions of the container, as for example the legs and arms.

The extension of the container which forms the head of the figure is preferably filled out by one large piece of candy, such as is shown at 6ª, and in order to enhance the simulation of a human figure, a suitable facial design is preferably provided upon this piece of candy. This may be done in any well known manner.

It will also be understood that other of the pieces of candy within the container may be similarly provided with suitable designs so as to carry out the idea of an animate figure, and that the resulting structure affords not only a sanitary container for candy, or the like, but also provides an artistic and novel ornament, in that through the medium of the decorations upon the pieces of candy, a lifelike representation of an animate figure may be formed.

Various changes may be made without departing from the spirit of the invention as claimed.

What is claimed is:

1. A container for candy comprising sheets of transparent paper simulating an animate figure and secured at their edges to each other, and a foraminous reinforcing covering for the same secured to the edges of said sheets.

2. A container for candy comprising sheets of transparent paper simulating an animate figure and secured at their edges to each other, and a foraminous reinforcing covering for the same secured to the edges of said sheets, the candy in said container having designs thereon to constitute the representation of the features of an animate figure.

3. A container for candy comprising sheets of transparent paper simulating an animate figure and secured at their edges to each other, and sheets of foraminous material secured at their edges to the edges of the sheets of paper.

In testimony whereof I have signed my name to this specification.

RUTH ENGLISH.